(12) United States Patent
Lee

(10) Patent No.: US 6,477,873 B2
(45) Date of Patent: Nov. 12, 2002

(54) CAR LOCK STRUCTURE IN AUTOMATIC TRANSMISSION SHIFT ROD

(76) Inventor: Chun-Chang Lee, No. 8, Alley 5, Lane 16, Kweiyang St., Thaishan Village Taipei County (TW)

( * ) Notice: Subject to any disclaimer, the term of this patent is extended or adjusted under 35 U.S.C. 154(b) by 71 days.

(21) Appl. No.: 09/824,730

(22) Filed: Apr. 4, 2001

(65) Prior Publication Data

US 2002/0144567 A1 Oct. 10, 2002

(51) Int. Cl.[7] .......................... F16H 57/00; G05G 5/00
(52) U.S. Cl. ............................ 70/201; 70/247
(58) Field of Search .................. 70/201, 202, 192–197, 70/181, 187, 251, 245–248, 478

(56) References Cited

U.S. PATENT DOCUMENTS

| | | | | | |
|---|---|---|---|---|---|
| 1,235,035 | A | * | 7/1917 | Jensen | 70/201 |
| 1,487,603 | A | * | 3/1924 | Ratto | 70/195 |
| 3,583,184 | A | * | 6/1971 | Papale | 70/193 |
| 5,329,792 | A | * | 7/1994 | Lee | 70/201 |
| 5,546,775 | A | * | 8/1996 | Lee | 70/201 |
| 5,735,148 | A | * | 4/1998 | Hsiao | 70/201 |
| 5,983,681 | A | * | 11/1999 | Yuan | 70/201 |
| 6,131,425 | A | * | 10/2000 | Li | 70/201 |
| 6,393,881 | B1 | * | 5/2002 | Lee | 70/247 |

\* cited by examiner

*Primary Examiner*—Anthony Knight
*Assistant Examiner*—John B. Walsh
(74) *Attorney, Agent, or Firm*—Bacon & Thomas, PLLC

(57) ABSTRACT

The present invention relates to a car lock structure built in an automatic transmission shift rod, and the entire lock structure is the head of an automatic transmission shift rod for users to lock it onto the automatic transmission rod body. The head in sequential order has a fixed cover, and a push button for pushing the rod; and a lock cylinder is sleeved into the head to restrict and lock the press button in order to attain the effect of locking the automatic transmission shift rod. After installing the entire set of the lock onto the automatic transmission shift rod, the lock is in the locked position, and the press button will not fall out from the fixed cover because of the insertion of the push rod. The fixed cover will restrict the lock cylinder in a position because the lock bracket of the lock cylinder snaps into the latch section at the top of the fixed cover such that the lock cylinder cannot be removed from the head of the automatic transmission shift rod. Such arrangement can prevent the entire lock from being damaged by car thieves.

7 Claims, 5 Drawing Sheets

CAR LOCK STRUCTURE IN AUTOMATIC TRANSMISSION SHIFT ROD

BACKGROUND OF THE INVENTION

1. Field of the Invention

The present invention relates to a car lock structure, more particularly to a car lock structure that is built in an automatic transmission shift rod.

2. Description of the Related Art

The traditional automatic transmission shift rod of vehicles has a push rod inside, and the push rod is disposed at a position between the transmission gears and the press button at the automatic transmission rod head. When the user presses the press button on the automatic transmission rod head to trigger the push rod, the push rod will release the latch between the transmission gears. Therefore, the traditional lock used for the automatic transmission shift rod generally has a lock member being disposed at the press button of the automatic transmission shift rod and the lock member latches into the press button, so that any unauthorized driver cannot shift the gear for the driving, and it further prevents the car from being stolen.

However, the current shift rod lock for automatic transmission vehicles does not meet the user's need, and the conventional lock usually needs to replace the original transmission shift rod structure and install additional mechanical parts onto the shift rod, and modify the structure of the shift rod body containing the lock structure. In addition to the increase in time and labor cost for the installation, it is a waste for the replaced parts of the original shift rod.

The car lock structure that is built in the automatic transmission shift rod of the present invention incorporates a main body for the user to lock onto the head of the transmission shift rod, and the transmission shift rod head sequentially inserts a fixed cover, and a push button for pushing the rod; and a lock cylinder being sleeved into the head to restrict and lock the press button in order to attain the effect of locking the automatic transmission shift rod. The shift rod head is installed onto the tip of the shift rod, and the insert of the fixed cover is inserted into the shift rod head being coupled to the shift rod body. The lock cylinder and the press button are sequentially inserted into the shift rod head making the push rod of the shift rod body to shift into the insert hole of the push rod. Finally, it locks the shift rod head and the shift rod body and completes the assembly of the entire lock with the transmission rod body. Such arrangement does not need to change the rod body or the push rod of the original shift rod.

SUMMARY OF THE INVENTION

The primary objective of the present invention is to provide a car lock structure that is built in the automatic transmission shift rod and allows the users to install such car lock on their own.

Another objective of the present invention is to provide a car lock structure that prevents others to damage the entire lock. The press button will fall off from the side of the fixed cover due to the insertion of the push rod, and the top of the fixed cover latches into the lock bracket of the latch portion of the lock cylinder and restricts the lock cylinder in position such that the lock cylinder cannot be removed from the automatic transmission rod head.

Another objective of the present invention is to provide a car lock structure that prevents the entire lock being damaged by others. An inner flange is disposed at the inner side of the penetrating section of the bottom of the fixed cover, and a cut groove is disposed at the outer wall at the top of the shift rod body. By means of the coupling between the inner flange and the cut groove, the entire shift rod head cannot be easily detached from the automatic transmission rod body. Therefore, it can prevent others from damaging the entire lock Another objective of the present invention is to provide a car lock structure in which a sheltered board for sheltering the screws being mounted at the shift rod head, so that others cannot loosen the screws and further prevents them from removing the shift rod head.

To make it easier for our examiner to understand the objective of the invention, its structure, innovative features, and its performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DETAILED DESCRIPTION OF THE PREFERRED EMBODIMENTS

Figure 1:
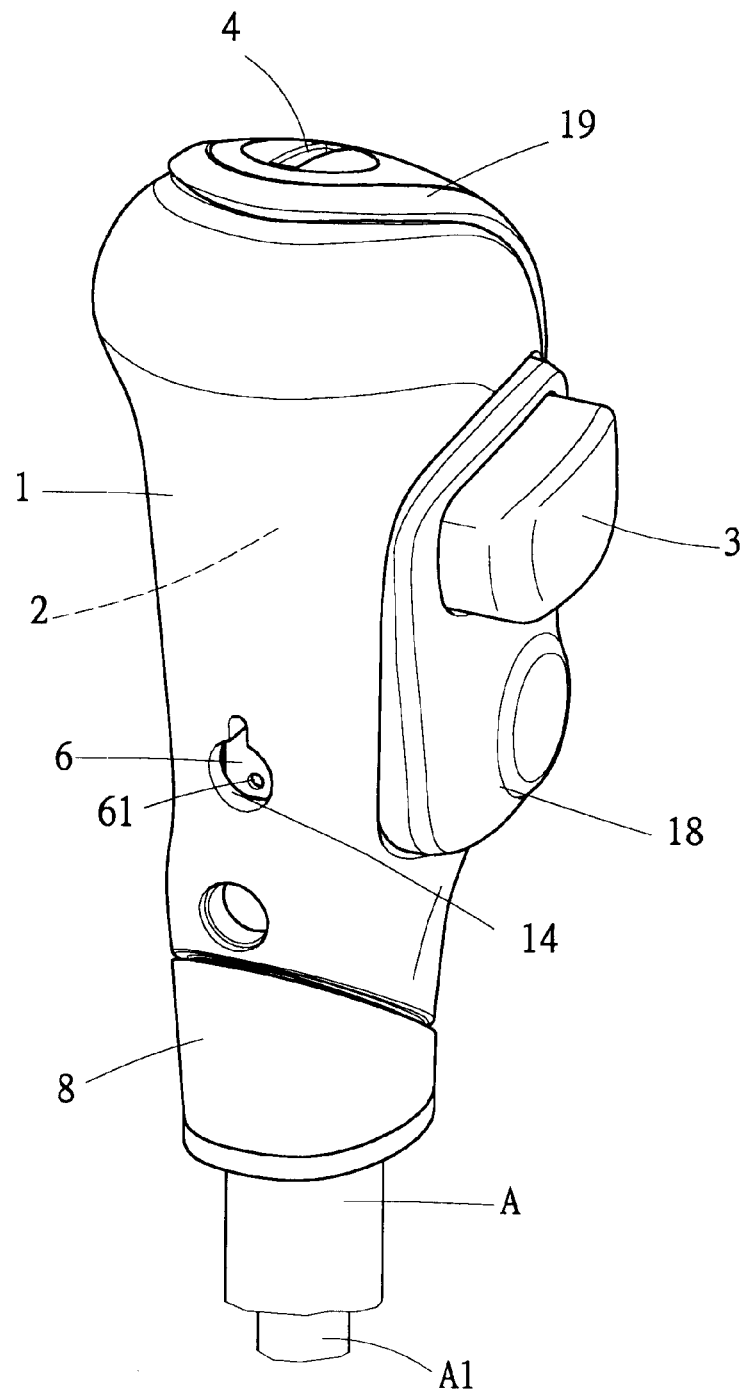
FIG. 1 shows the external structure of the present invention.

FIG. 1 shows the basic structure of the entire car lock structure being built in the automatic transmission shift rod, which mainly comprising the structure of a shift rod head (1) on the shift rod body (A), and the shift rod head (1) sequentially couples to a fixed cover (2) and a press button (3) for triggering a push rod (A1), and the shift rod head (1) also couples to a lock cylinder (4) to latch the press button (3) such that the user can turn the lock cylinder by a key to lock or unlock the shift rod body (A).

Figure 2:
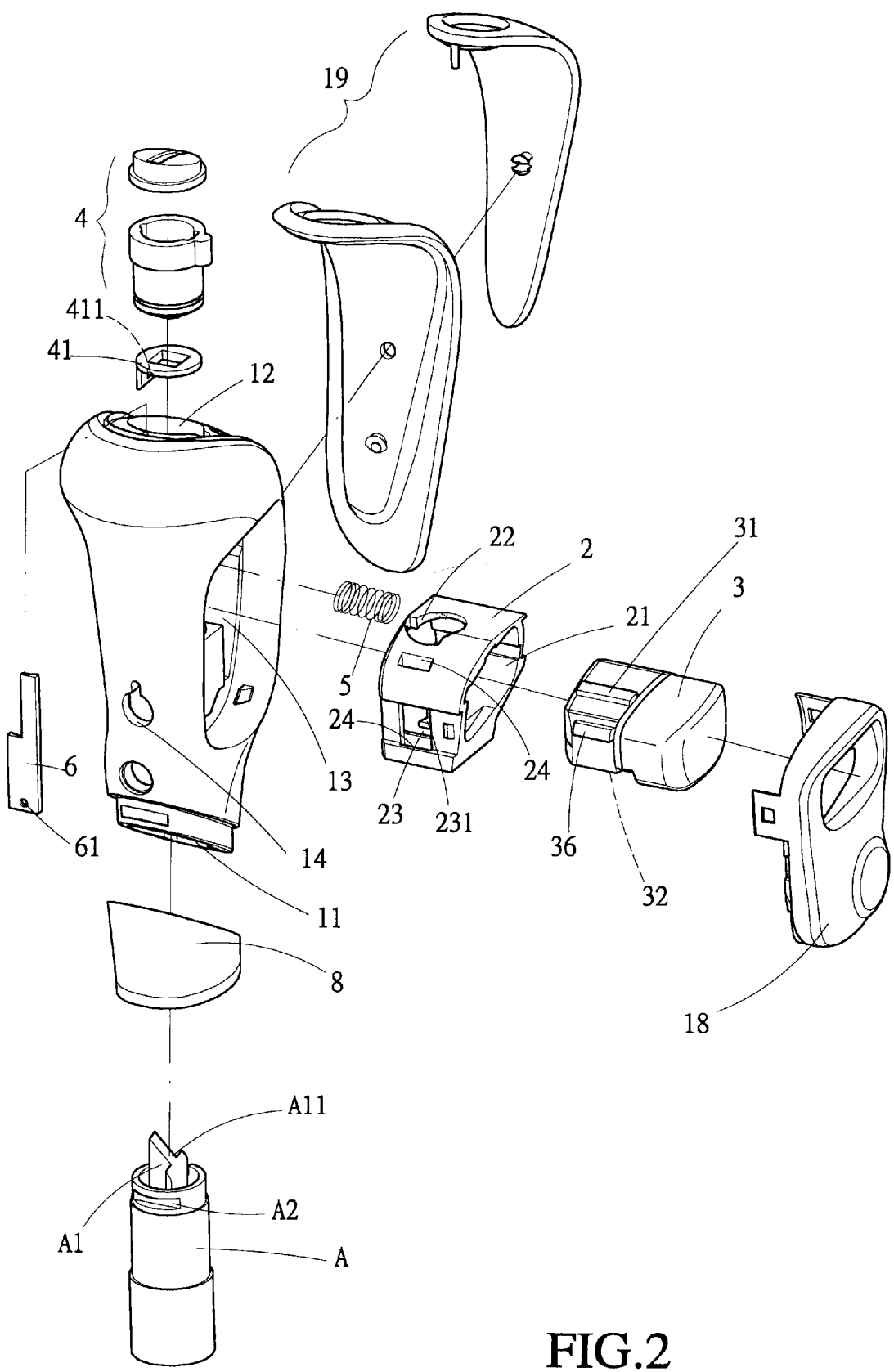
FIG. 2 shows the disassembled parts of the structure of the present invention.
Figure 3:
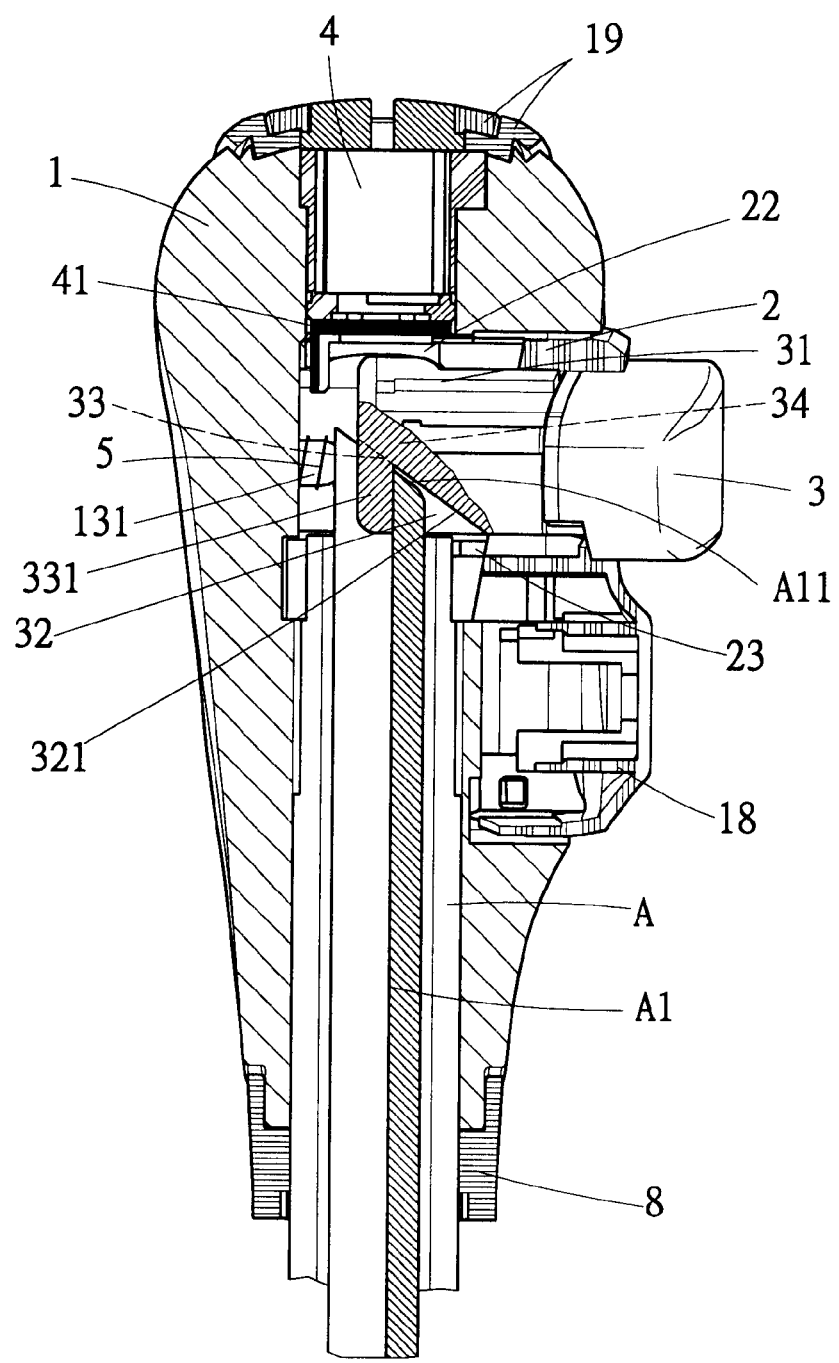
FIG. 3 shows the cross-section of the entire lock of the present invention.
Figure 4:
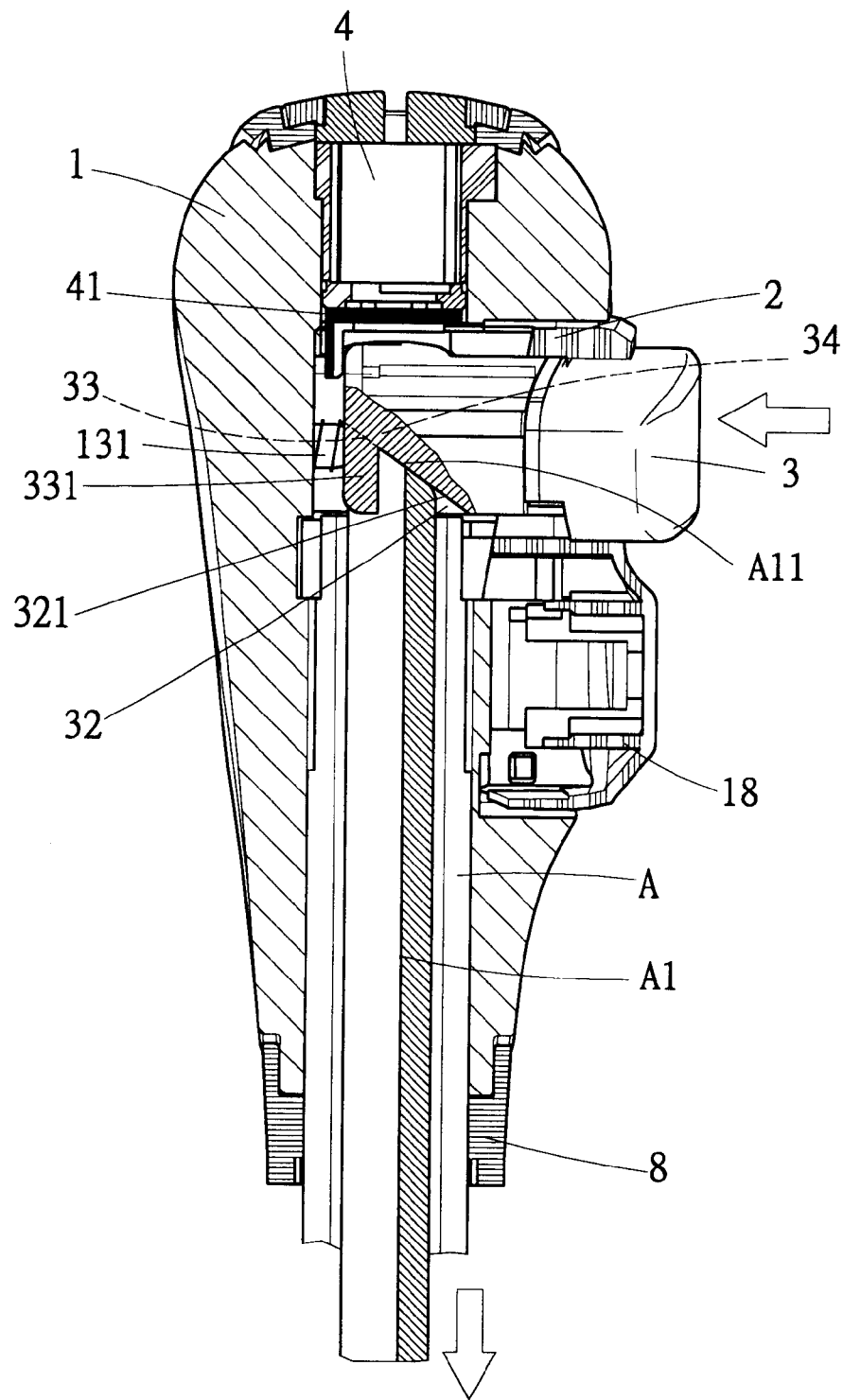
FIG. 4 illustrates the motion of the push rod of the present invention.

As shown in FIGS. 2, 3 and 4, the bottom of the shift rod head (1) is for passing the shift rod body (A) into the shift rod hole (11), and the lock cylinder (4) is coupled to another cylinder lock hole (12) on the shift rod head (1), and an accommodation chamber (13) being formed between a shift rod hole (11) and the lock cylinder hole (12) on a lateral side of the shift rod head (1) for coupling to the fixed cover (2). The fixed cover has a penetrating press button hole (21) for the press button (3) to pass through and shift back and forth facing the interior of the shift rod head (1), and it forms a penetrating section (23) at -the bottom of the fixed cover (2) for the push rod (A1) to insert into press button (3), and it forms an inner flange (231) at the inner side of the penetrating section (23) of the fixed cover (2). It also forms a corresponsive cut groove (A2) on the outer wall at the top of the shift rod body (A). The bottom of the press button (3) has a push rod insert hole (32), and the top section of the push rod insert hole has a corresponding second inclined (321)

plane which presses against a first inclined plane (A11) of the push rod (A1). As shown in FIG. 4, the pressing action between the incline planes on the press button (3) and the push rod (A1) proceeds with the change of gears by triggering the push rod (A) with the press button (3). It also forms a latching section (22) on the contact surface between the fixed cover (2) and the cylinder lock (4) for the insertion of the lock bracket (41). The press button (3) forms a latching section at the corresponding position to latch the lock bracket (41). When we lock the lock cylinder by turning a key, the lock bracket (41) of the lock cylinder (4) latches with the locking section (31) of the press button (3) such that the press button (3) cannot push the push rod (A1) to lock the shift rod by shifting the shift rod body. Further, a spring box (131) and an insert hole (34) are formed between the accommodation chamber (13) of the shift rod head (1) and the press button (3) for inserting a spring (5) inside for restoring the press button (3).

Figure 5:
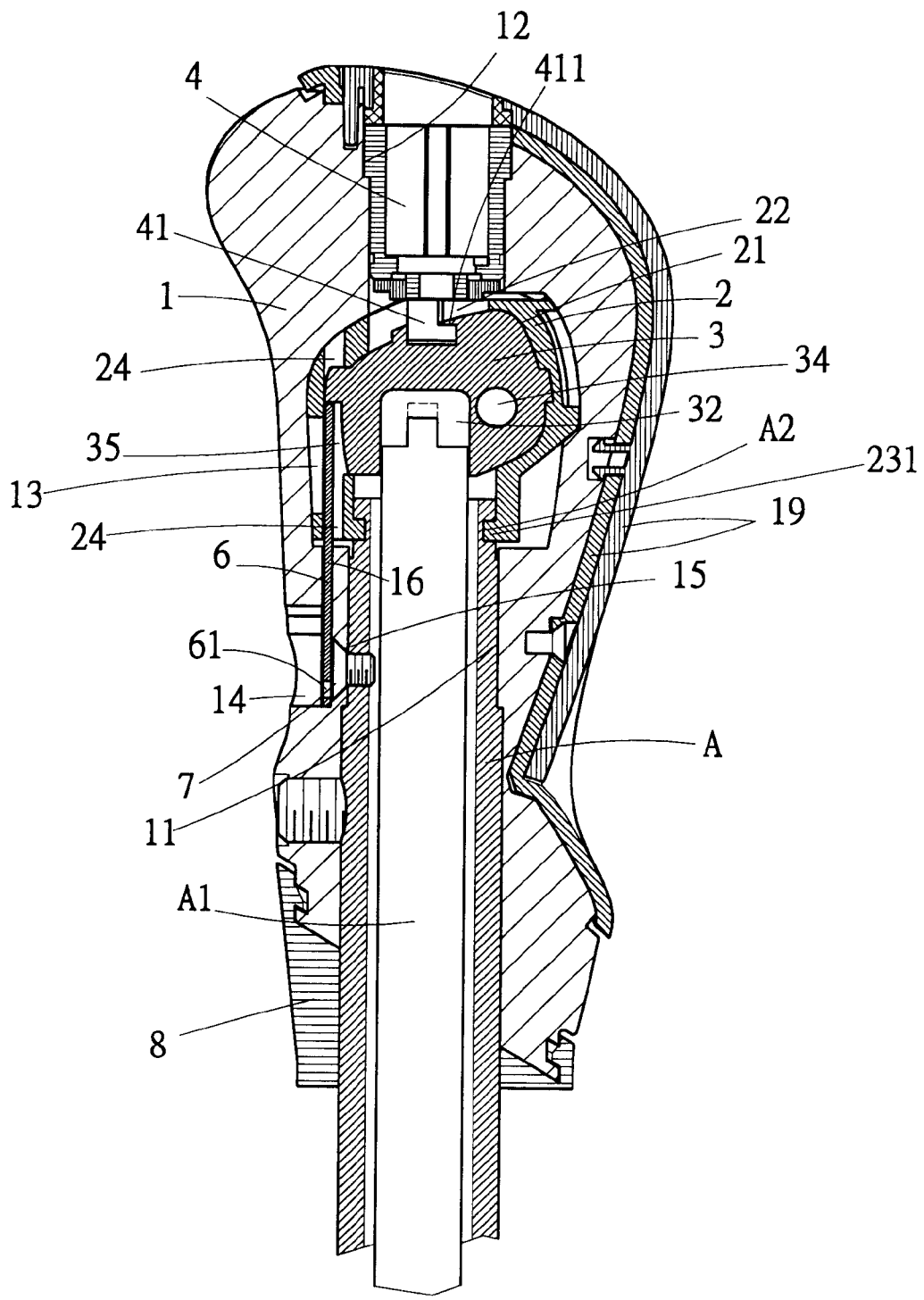
FIG. 5 shows the cross-section of the entire lock of the present invention from another direction.

Please refer to FIGS. 2, 3, and 5. The latching section (22) at the top of the fixed cover (2) has a hole for latching the opening (411) on the lateral side of the lock bracket (41). When the lock cylinder (4) is in the locked position, as shown in FIG. 5, the opening (411) of the lock bracket (41) latches into the latching end (22) to produce a latching for restricting its -position and fix the cylinder lock (4) in position which cannot be removed from the top of the shift rod head (1). A push rod hole (32) is formed at the bottom of the press button (3) for the insertion of the push rod (A1), and a latching edge (331) of the push rod (A1) is formed at the rear end of the opening (33) as shown in FIG. 3. When the end of the push rod (A1) is inserted into the push rod insert hole (32) of the press button (3), the press button (3) has a restriction in position on the lateral side due to the coupling of the latching edge (331) and the rod body of the push rod (A1) such that the press button (3) will not fall off from a side of the fixed cover (2), and the fixed cover (2) cannot be removed from the automatic transmission rod head (1) due to the latching between the latching section (22) and the lock bracket (41) of the lock cylinder (4).

In FIG. 5, when the entire lock of the present invention is assembled, the shift rod head (1) will be installed onto the top of the shift rod body (A) first, and then the fixed cover (2) being inserted into the shift rod head (1) such that the inner flange (231) at the bottom of the fixed cover (2) will be inserted into and coupled with the cut groove (A2) of the shift rod body (A). Then the lock cylinder (4) is sequentially inserted into the lock cylinder hole (12) of the shift rod head (1), and the press button (3) being inserted into the press button hole (21) of the fixed cover (2), and the push rod (A1) of the shift rod body (A) being inserted into the push rod insert hole (32) of press button, and finally the shift rod head and the shift rod body are locked together to complete the assembly of the entire lock. By means of the coupling by insertion of the inner flange (231) of the fixed cover (2) and the cut groove (A2) of the shift rod body (A), it can prevent the shift rod head (1) from being detached from the top of the shift rod body. Therefore, after the entire lock is completely installed on the shift rod body, it can prevent it from being damaged by unauthorized users.

Furthermore, as shown in FIGS. 1 and 5, a penetrating screw hole (14) is formed at the coupling area of the shift rod head (1) and the shift rod body (A), and the bottom of the penetrating screw hole (14) proximate to the shift rod hole (11) has a fish-eye hole penetrating the wall surface to facilitate the passing through of the screw (7) into the shift rod head (1) to directly lock into the shift rod body (A). It locks the shift rod head (1) and the shift rod body (A) together such that shift rod head (1) will not fall off from the shift rod body (A). More particularly, an insert groove (16) having a passage to the accommodation chamber (13) being formed at the location the penetrating screw hole (14) proximate to the fish-eye hole (15), and an interconnecting insert groove (24) being formed at the corresponsive position to facilitate the insertion of a shelter board (6) into the insert groove (16). Such shelter board mainly blocks the area between penetrating screw hole (14) and the fish-eye hole (15), and forms a shelter for the screw (7), and the shelter board has a triggering hole (61) at the pressing edge. Generally, the triggering hole (61) and the screw hole (14) match with each other, and the penetrating hole (35) is formed at the bottom of the press button (3) for receiving the shelter board (6). Generally, the position of the penetrating hole (35) does not match with the shelter board (6), therefore, when the entire lock at the shift rod head (1) is in locked position, the shelter board (6) cannot be titled upward due to the blocking by the press button (3) and has a shelter on the screw (7). Such arrangement can prevent the shift rod head (1) from being removed and the screw unscrewed by unauthorized person. When the entire lock is in unlocked position, the press button (3) can shift towards the interior of the shift rod head (1) by pressing the button. As soon as the press button (3) moves in a certain distance, the penetrating hole (35) at its bottom will be exactly on top of the shelter board (6) allowing the shelter board (6) to have an uplifting space. The user can trigger the shelter board (6) to shift it upward such that the screwdriver can extend into the penetrating hole (14) and to the screw (7) for tightening or loosening the screws.

Further, as shown in FIG. 1, the entire lock of the present invention may have a rear end seal (8) at the bottom of the shift rod head (1), and a fixed cover seal (18) and a lock cylinder seal (19) being latched onto the external side of the press button (3) and the external side of the lock cylinder respectively in order to improve the integration of the entire lock structure and enhance the artistic appearance by sheltering the fixed cover structure and the lock cylinder structure.

The structural design of the entire car lock structure in the automatic transmission shift rod does not have to replace the currently existed shift rod body, and the user can easily complete the assembly of the entire lock onto the shift rod body. It does not only simplify the lock assembly, but also uses the major mechanical parts of the originally existed shift rod body and shift rod and causes no unnecessary waste. After the lock assembly and when the lock is in locked position, the lock cannot be easily damage or removed by others. Such design provides a better and feasible car lock structure for the automatic transmission shift rod.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A car lock structure in an automatic transmission shift rod, comprising:

a shift rod head, being mounted onto the top of a shift rod body, forming a shift rod hole and a cylinder lock hole, and forming an accommodation chamber capable of passing through the shift rod hole and the cylinder lock hole on the lateral side such that a push rod in the shift rod body extends into the accommodation chamber;

a lock cylinder, being mounted into the cylinder lock hole, and a lock bracket extends into the accommodation chamber for latching a press button:

a fixed cover, being mounted into the accommodation chamber of the shift rod head, and having a penetrating press button hole, and its bottom being a penetrating section into where a push rod extends, and its top being a latching section into where the lock bracket latches;

a press button, being mounted and passing through the press button hole, and its bottom has a push rod insert hole for triggering the push rod, and its top forms a locking section for latching the lock bracket, and a latching edge being formed at the rear end of the opening of the push rod insert hole for latching the push rod;

wherein the fixed cover being mounted into the accommodation chamber of the shift rod head, and the press button being inserted into the press button hole of the fixed cover, and then the entire structure including the shift rod head of the lock being mounted onto the top of the shift rod body such that the push rod extends into the push rod hole of the press button in order to complete the assembly of the entire lock structure; and the press button does not fall off from a side of the fixed cover due to the insertion of the push rod, and the fixed cover cannot be removed from the shift rod head since the latching section and the lock bracket are latched with each other, thereby such arrangement can prevent the entire lock from being damaged by an unauthorized user.

2. A car lock structure in an automatic transmission shift rod of claim 1, wherein said shift rod head's accommodation chamber and said press button forming a spring box and an insert hole in between them where a spring being disposed to allow the automatic restoring of the press button.

3. A car lock structure in an automatic transmission shift rod of claim 1, wherein said press button and said push rod being pushed by a inclined plane, and the press button working together with a first inclined plane at the top section of the push rod and forming a second inclined plane at the top section of the push rod corresponsive to the action of the first inclined plane; wherein when the press button shifts towards the interior of the shift rod head, the push rod acts downward due to the pushing of the inclined plane.

4. A car lock structure in an automatic transmission shift rod of claim 1, wherein said fixed cover's bottom section having a penetrating section forms an inner flange, and a corresponding cut groove being formed on the outer wall at the top section of the shift rod body, such that the entire shift rod body cannot be detached due to the coupling of the inner flange and the cut groove and hence it prevents the entire lock from being damaged by unauthorized user.

5. A car lock structure in an automatic transmission shift rod of claim 1, wherein said shift rod head and shift rod body form a screw hole at their coupling section, and the bottom of the screw hole proximate to the shift rod hole partially forms a penetrating wall of a fish-eye hole to facilitate the locking of the shift rod body by passing the screw through the shift rod head and locking the shift rod head with the shift rod body such that the shift rod head cannot fall off.

6. A car lock structure in an automatic transmission shift rod of claim 5, wherein said screw hole forms an insert groove adjacent to the fish-eye hole passing to the accommodation chamber to facilitate the formation of a shelter board in the insert groove, and the shelter board can block the space between the screw hole and the fish-eye hole and shelter the screw, and the pressing edge of the shelter board forms a triggering hole, wherein the trigger hole and the screw hole are coupled, and the bottom edge of the press button forms another hole to accommodate the extension of the shelter board, and the position of such hole does not match with the shelter board until the lock is opened and when the press button is pressed inward.

7. A car lock structure in an automatic transmission shift rod of claim 1, wherein said shift rod head forms a rear end seal at its bottom, and a fixed cover housing and a lock cylinder housing at the external side of the press button and the external side of the lock cylinder respectively to shelter the fixed cover structure and the lock cylinder structure into to enhance the integration and artistic appearance for the entire lock structure.

* * * * *